United States Patent [19]
Inada et al.

[11] Patent Number: 5,254,306
[45] Date of Patent: Oct. 19, 1993

[54] METHOD FOR MAKING A DOUBLE LAYER MOLDED PRODUCT USING A DAM IN THE MOLD CAVITY

[75] Inventors: Yoshihiro Inada; Hiroshi Mukai; Yasunobu Teramoto; Hiroshisa Narukawa, all of Aichi, Japan

[73] Assignee: Toyoda Gosei Co., Ltd., Nishikasugai, Japan

[21] Appl. No.: 782,144

[22] Filed: Oct. 28, 1991

[30] Foreign Application Priority Data

Oct. 29, 1990 [JP] Japan .................. 1-291049
Oct. 31, 1990 [JP] Japan .................. 1-296706

[51] Int. Cl.⁵ ............. B29C 45/16; B29C 45/28; B29C 45/30
[52] U.S. Cl. .................. 264/572; 264/255; 264/328.8; 264/328.9; 264/328.12; 425/130; 425/566
[58] Field of Search ......... 264/513, 572, 50, 328.1, 264/328.8, 328.9, 328.12, 241, 255; 425/542, 130, 523, 553, 566, 573

[56] References Cited

U.S. PATENT DOCUMENTS

| | | | |
|---|---|---|---|
| 4,247,515 | 1/1981 | Olabisi | 264/328.12 |
| 4,474,717 | 10/1984 | Hendry | 264/50 |
| 4,498,860 | 2/1985 | Gahan | 264/328.9 |
| 4,781,879 | 11/1988 | Oishi | 264/328.12 |
| 5,030,076 | 7/1991 | Ebenhofer | 264/572 |
| 5,044,924 | 9/1991 | Loren | 425/542 |

FOREIGN PATENT DOCUMENTS

| | | | |
|---|---|---|---|
| 58-81137 | 5/1983 | Japan | 264/328.12 |
| 63-31265 | 8/1989 | Japan | . |
| 1-206012 | 8/1989 | Japan | . |
| 64-20176 | 8/1990 | Japan | . |

*Primary Examiner*—Catherine Timm
*Attorney, Agent, or Firm*—Cushman, Darby & Cushman

[57] ABSTRACT

A mold for making a double layer molded product, such as a molded product of sandwich construction or a hollow molded product having a dam within the mold cavity adjacent its gate. The dam projects in a direction transverse to that in which the inner-forming material is injected, and a gap is defined between the dam and the walls of the cavity. With this configuration, the core thickness of the molded product of sandwich construction, or the skin thickness of the hollow molded product, are made uniform.

10 Claims, 5 Drawing Sheets

METHOD FOR MAKING A DOUBLE LAYER MOLDED PRODUCT USING A DAM IN THE MOLD CAVITY

BACKGROUND OF THE INVENTION

1. Field of the Invention

The present invention relates to a mold for making a double layer molded product composed of a skin layer and an inner layer.

2. Description of the Related Art

Molded products of sandwich construction are typically double layer molded products composed of a skin and a core which are formed from different synthetic resins. Hollow molded products are also double layer molded products in that they are composed of a skin of synthetic resin with a hollow portion (e.g. gas) formed therewithin.

When making a double layer molded product, such as one of sandwich construction or one which is hollow molded, a skin-forming material is first injected into a cavity, and then an inner-forming material (a core-forming resin or fluid for forming a hollow portion) is injected into the skin-forming material.

As shown in FIGS. 9 and 10, conventional molds for making double layer molded products have a cavity 91. An end portion of the cavity 91 communicates with a film gate 92. The film gate 92 is connected to a synthetic resin or other material injector via a runner 93 and a sprue 94.

When making a molded product of sandwich construction, a softened skin-forming material 81 is injected into the cavity 91 through the film gate 92. Then a softened core-forming synthetic resin 82 is injected into the softened synthetic resin 81 through the film gate 92.

When making a hollow molded product, the inner, hollow part may be formed by injecting a fluid, such as a gas, in lieu of the softened core-forming material 82.

However, typically the inner, core-forming material is not properly injected in the vicinity of the gate of the conventional mold. More particularly, with reference to FIGS. 9 and 10, the flow of the injected inner-forming material is greatly influenced by the softness of the skin and the pressure gradient. A relatively great pressure gradient is exerted in the direction in which the material is injected, whereas a lesser pressure gradient is exerted transverse thereto. Thus, the longitudinal direction of the cavity 91 receives a relatively sharp pressure gradient. On the other hand, the direction across the cavity 91 receives a lesser pressure gradient.

Thus, the core-forming material 82, as an inner-forming material, is injected so as to be long and narrow along the longitudinal direction of the cavity 91. As a result, the thickness of the core increases from the gate to the more remote portions of the mold, resulting in an unevenness in core thickness.

SUMMARY OF THE INVENTION

It is thus an object of the present invention to provide a mold for making a double layer molded product which overcomes the problems associated with injecting the inner-forming material in the vicinity of the gate.

The present invention provides a mold with a cavity into which a skin-forming material and then an inner-forming material are injected to form a double layer molded product, which includes a dam within the cavity, adjacent the gate, which extends in a direction transverse to that in which the inner-forming material is injected and defines a gap with the side walls of the cavity.

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENTS

Figure 1:
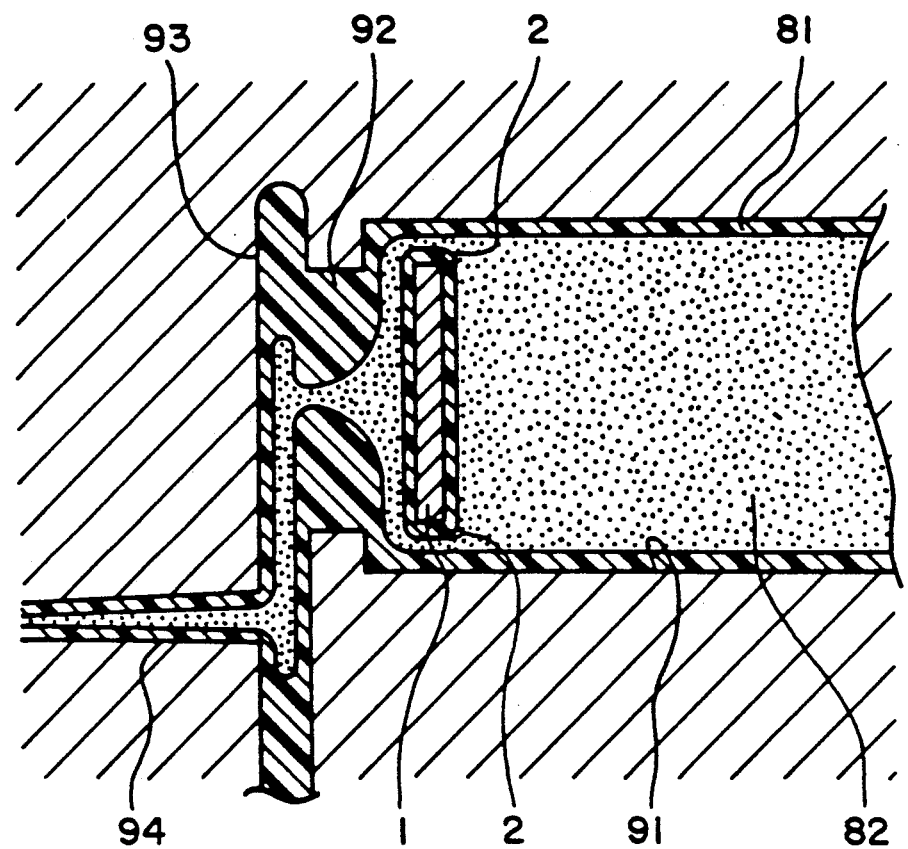
FIG. 1 is a sectional plan view of a mold in accordance with a first embodiment of the invention, during molding.

The present invention is adapted to be used for making a double layer molded product such as a molded product of sandwich construction, or a hollow molded product.

The present invention is characterized by a dam provided adjacent the gate to extend in a direction transverse to that in which the inner-forming material is injected, so that the dam intersects the longitudinal axis of injection of the inner-forming material defined by the gate, and which defines a gap with the side walls of the cavity to allow the inner-forming material to pass. A film gate or the like may be used as the gate. The dam may project from a bottom wall or a top wall, or both. The dam may be divided into a plurality of parts to be separately provided along a direction transverse to that in which the inner-forming material is injected. The inner-forming material is injected to pass the da and enter the skin.

As noted above, in accordance with the present invention, the dam is so provided adjacent the gate to block the flow of the inner-forming material when injecting the skin-forming material from the gate into the cavity and, therefore, into the synthetic resin. Accordingly, the injected material will flow along the dam and a part of the inner-forming material will flow into the synthetic resin of the skin by passing through the gap(s)

formed between the dam and side walls of the cavity. The other part of the inner-forming material will flow into the synthetic resin by passing over the dam. As a result, pressure gradients in the direction in which the material is injected and the direction transverse thereto are made uniform. Thus, the inner-forming material is widely and uniformly injected into the skin from the vicinity of the gate to the more remote portions of the mold, thereby eliminating the deficiencies in injection that often occur with conventional molds. This leads to a double layer molded product which has a skin thickness which is uniform throughout.

A mold in accordance with the present invention may comprise a cavity into which a skin-forming material and then a core-forming material as an inner-forming material are injected through a runner and a gate to form a molded product of sandwich construction, a dam provided in the cavity adjacent the gate, and a slidable core member. When provided, the slidable core member is mounted so as to be slidably movable within an entrance of the gate of the mold by means of, for example, a hydraulic cylinder rod.

As the first step of the process for making a molded product of sandwich construction using the above mold, the skin-forming material is injected into the cavity. Then the core (inner) forming material is injected into the skin-forming material, and the mold is held under pressure. The slidable core member is then moved relative to the gate. A part of the skin-forming material which remains soft in the gate and the core-forming material which it surrounds are cut between the gate and the runner by movement of the slidable core member and are forced into the cavity by the slidable core member. As a result, a cut surface is formed as a part of the skin, but because it is an elastic and relatively soft resinous material, it expands upon entering the cavity and forms an integral part of the skin of the molded product in the cavity, while closing the hole through which the core-forming material has been injected. Therefore, the cut surface presents a good and pleasing appearance and is comparable to the rest of the skin in weatherability, water resistance, and every other aspect of durability, since it does not expose any cut section of the core-forming material. In addition, both the skin- and core-forming materials are filled so as to have almost uniform thicknesses in the cavity.

The skin-forming material can be, for example, a resin obtained by blending polypropylene and an EPDM (ethylene-propylene-diene rubber), an EVA (ethylene-vinyl acetate) resin, an SEBS (styrene-ethylene-butadiene-styrene) resin, an SBS (styrene-butadiene-styrene) resin, or a soft PVC (polyvinyl chloride) resin.

The inner-forming material can be, for example, an AS (acrylonitrile-styrene) resin, an ABS (acrylonitrile-butadiene-styrene) resin, a hard PVC resin, a polypropylene resin containing a filler such as talc, or a mixture of any such resin and a reinforcing material such as glass fiber. When injecting hard material, soft material may be simultaneously injected surrounding the hard material.

EMBODIMENT 1

A first embodiment of a mold for making a double layer molded product in accordance with the present invention will be described with reference to FIGS. 1 and 2. This embodiment relates to a molded product of sandwich construction.

In this embodiment, a dam 1 is provided within a cavity 91, adjacent a film gate 92, so as to extend a direction transverse to that in which a softened core-forming material, i.e. synthetic resin 82, is injected as an inner-forming material. A gap 2 is defined between the dam 1 and the side walls of the cavity 91.

The width of the dam 1 is greater than that of the film gate 92 and, in the illustrated embodiment, the dam is formed integrally with and projects from the bottom wall of the cavity 91. The gap 2 defines a flow path between the dam 1 and the side walls of the cavity 91. A gap 3 is also formed between the dam 1 and the top wall of the cavity 91 to define another flow path. The mold otherwise corresponds to the conventional mold.

When making a molded product of sandwich construction as a double layer molded product with the mold of the invention, a softened skin-forming synthetic resin 81 is first injected as a skin-forming material from a synthetic resin injector into the cavity 91 through a sprue 91, a runner 93 and a film gate 92. Then a softened core-forming synthetic resin 82 is injected as an inner-forming material from another injector into the synthetic resin 81 in the cavity 91 through the sprue 94, the runner 93 and the film gate 92.

Figure 2:
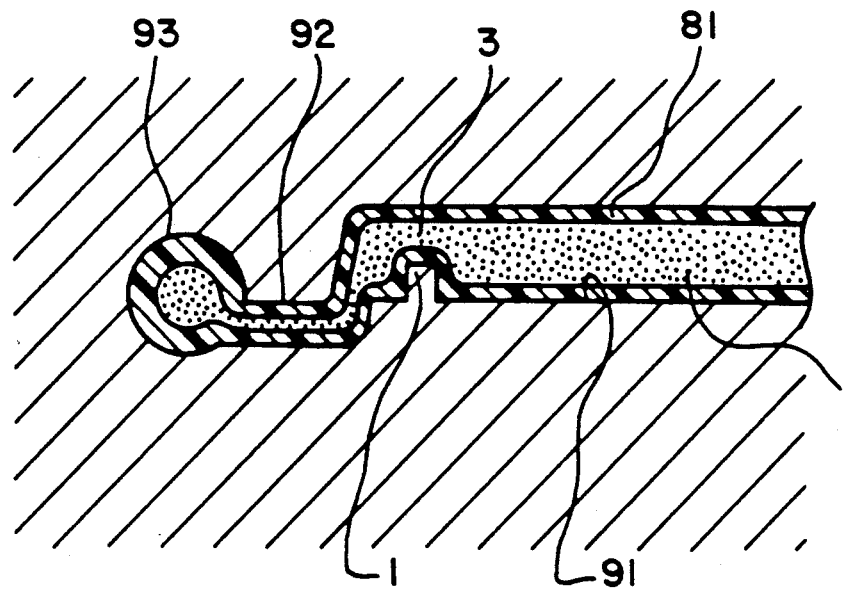
FIG. 2 is a sectional side elevational view of the mold of the first embodiment, during molding.

In this case, as shown in FIGS. 1 and 2, the dam 1 provided around the film gate 92 prevents the synthetic resin 82 injected through the film gate 92 from flowing straight into the cavity. Rather, the synthetic resin 82 flows along the dam in a direction across or transverse to the axis of the injection defined by the gate. Part of the synthetic resin 82 flows into the synthetic resin 81 in the cavity 91 by passing through the gap 2 formed at each side of the dam 1. The other part of the synthetic resin 82 flows into the synthetic resin 81 by passing through the gap 3 formed between the dam 1 and the top wall of the cavity 91.

As a result, the pressure gradient in the direction of injection of the synthetic resin 82, i.e., in the longitudinal direction of the cavity 91, and the pressure gradient in the direction transverse thereto, i.e., in the direction across the cavity 91, are made uniform. Thus, the synthetic resin 82 can be uniformly injected into the synthetic resin 81.

The above formed double layer molded product has a skin, i.e., synthetic resin 81, of uniform thickness and a core, i.e., synthetic resin 82 as an inner-forming material, injected into the skin.

The mold according to this embodiment can provide a double layer molded product of sandwich construction with a uniform core and skin thickness.

A fluid, such as a gas, may be injected in place of the synthetic resin 82 to make a hollow double layer molded product, with a uniform skin thickness.

EMBODIMENT 2

Figure 7:
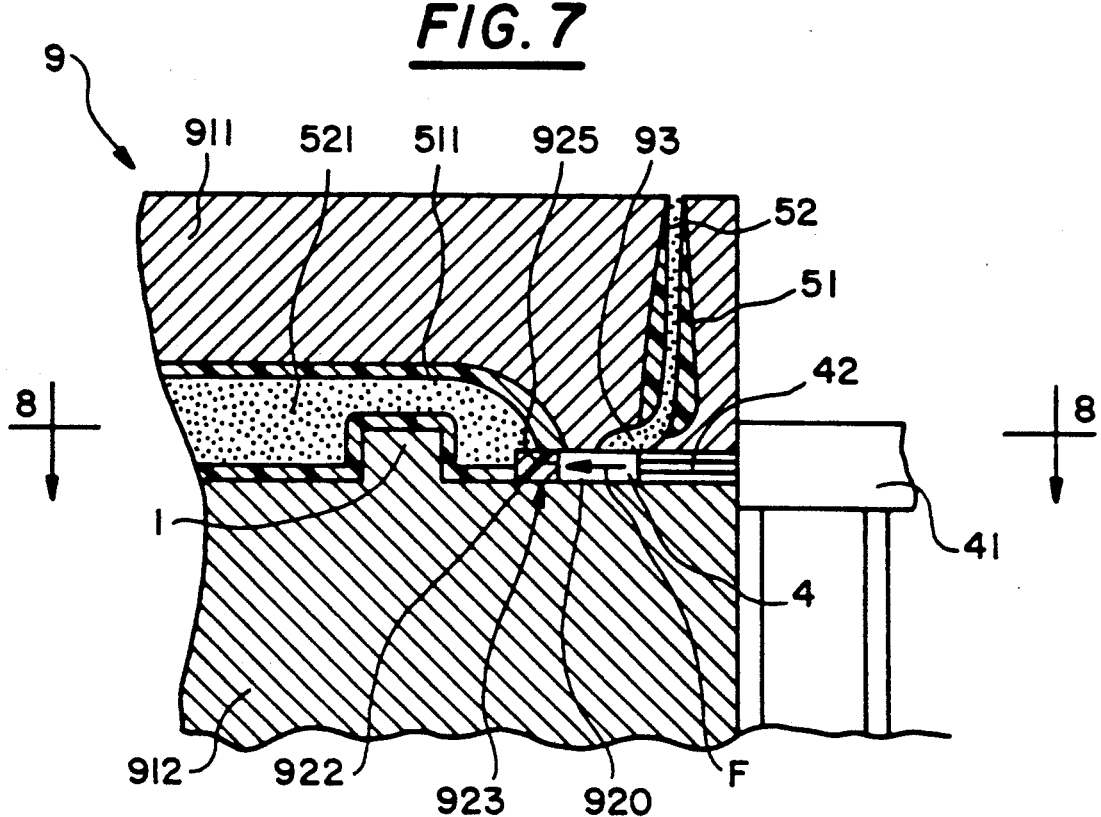
FIG. 7 is a view similar to FIG. 5, but showing the end stage of the process.
Figure 8:
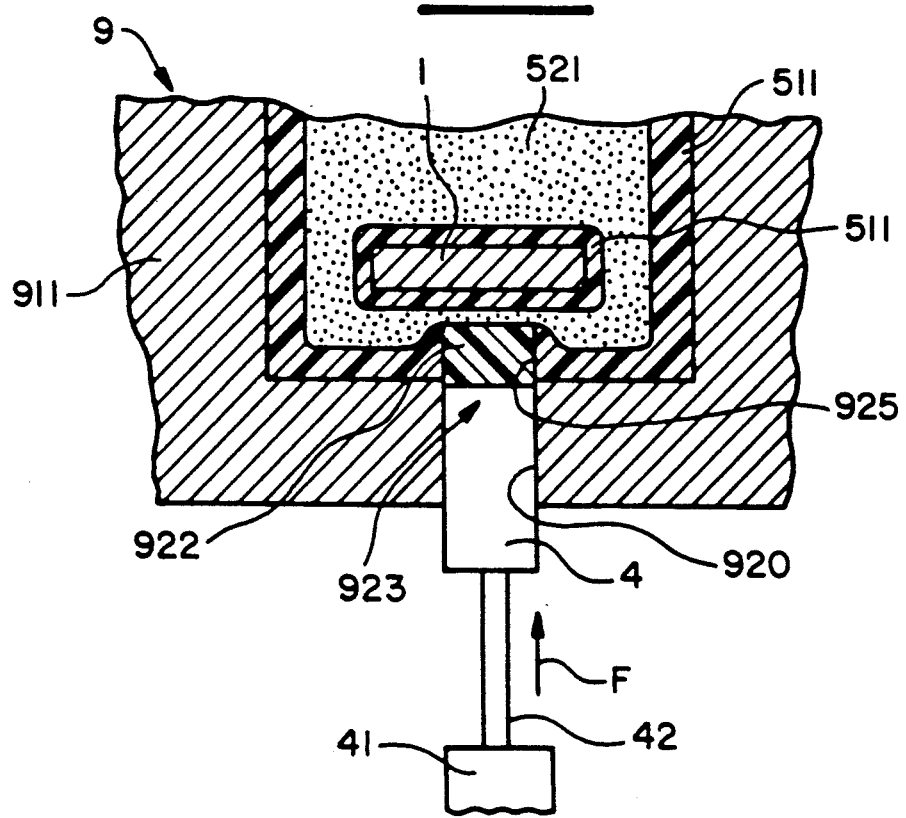
FIG. 8 is a fragmentary sectional view taken along the line 8—8 of FIG. 7.
Figure 9:
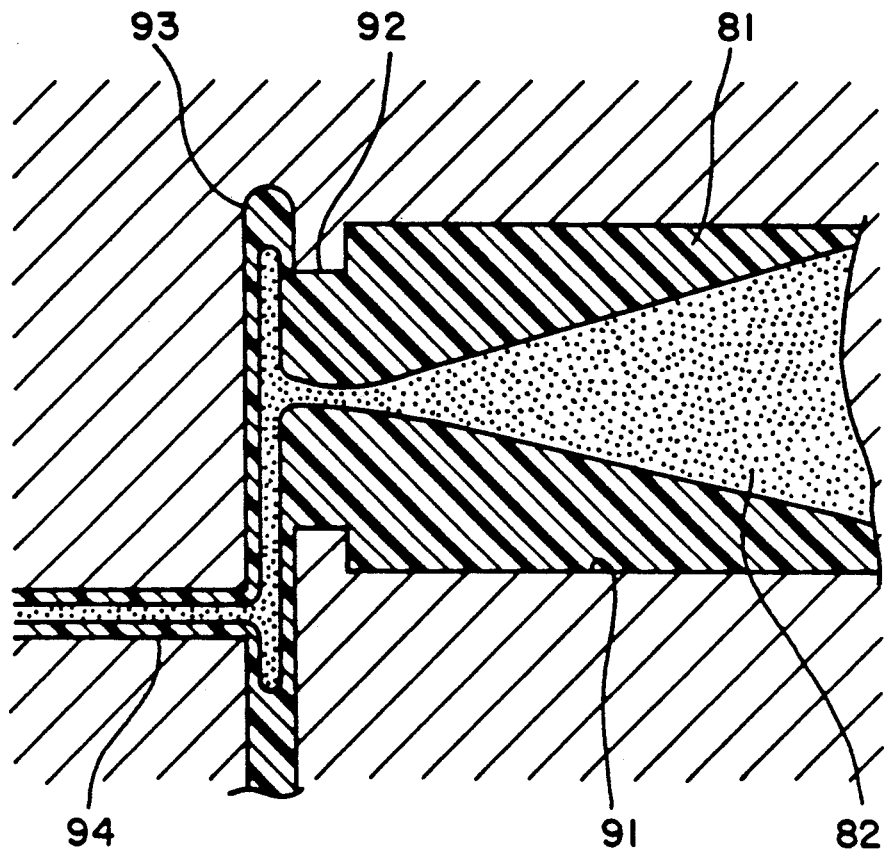
FIG. 9 is a sectional plan view of a conventional mold during molding.
Figure 10:
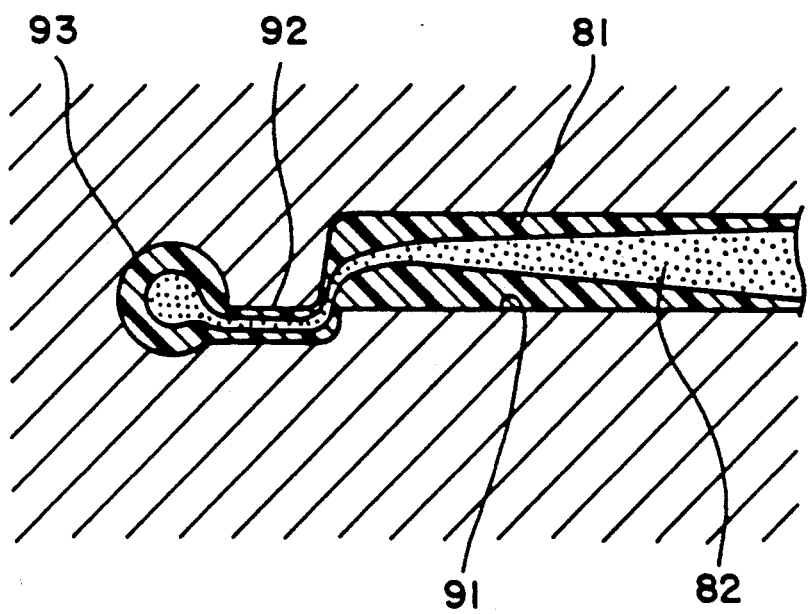
FIG. 10 is a sectional side elevational view of the conventional mold during molding.

A second embodiment of the process and mold of the present invention will now be described with reference to FIGS. 3 to 8. The process is used for making a molded product of sandwich construction which comprises a core 521 enveloped by a skin 511, as shown in FIGS. 7 and 8.

Figure 3:
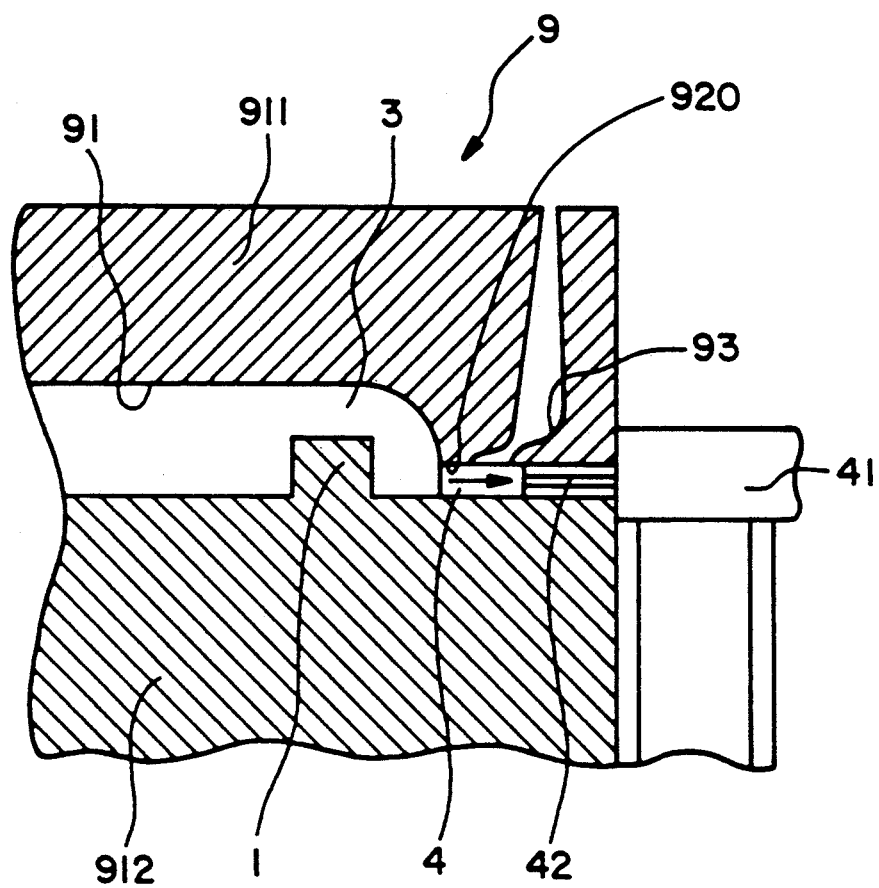
FIG. 3 is a fragmentary side elevational view, partly in section, of a second embodiment of a mold embodying the present invention.

The process is carried out with a mold 9 which comprises an upper mold half 911 having a gate 920 and a runner 93 at one end thereof, and a lower mold half 912, as shown in FIG. 3. The upper and lower mold halves 911 and 912 define therebetween a cavity 91 which is shaped so as to define the desired shaped of the molded product to be manufactured. The dam 1 is provided in the cavity 91 adjacent the gate 920 in the same manner as in the first embodiment.

According to a salient feature of this embodiment, a slidable core member 4 coaxial with the gate 920 is provided near the gate 920, as shown in FIGS. and 5 to 8. The slidable core member 4 is axially slidable through the gate 920 toward and away from the cavity 91 for the purpose which will hereinafter be described. A hydraulic cylinder 41 having a piston rod 42 coaxially connected to the slidable core member 4 is provided for actuating the sliding motion of the slidable core member 4.

Figure 5:
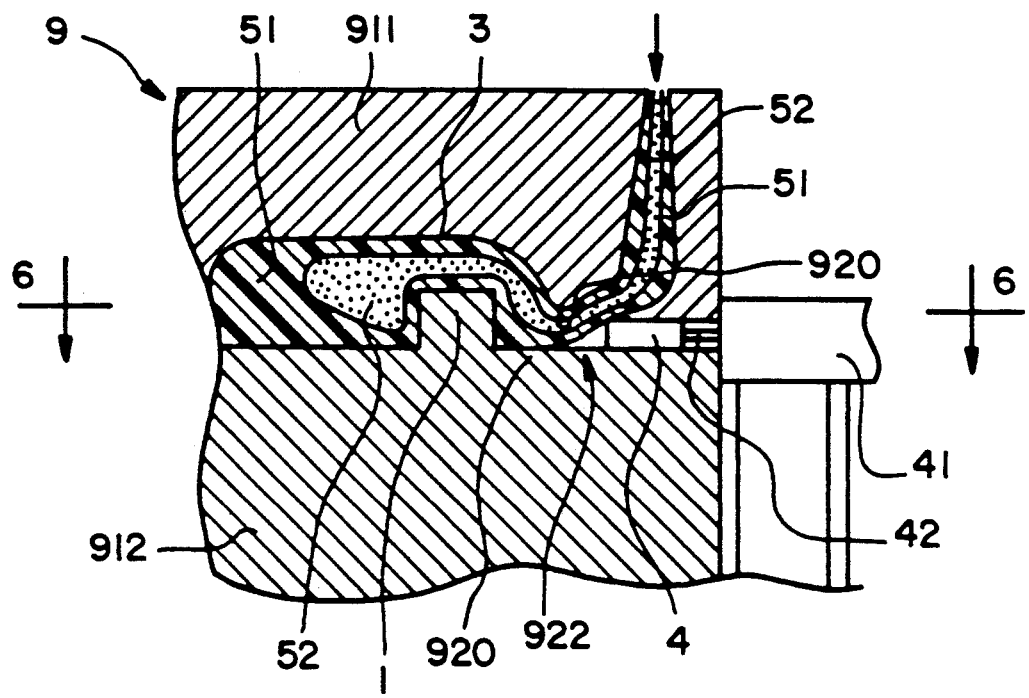
FIG. 5 is a view similar to FIG. 1, but showing one stage of a process embodying the present invention.
Figure 6:
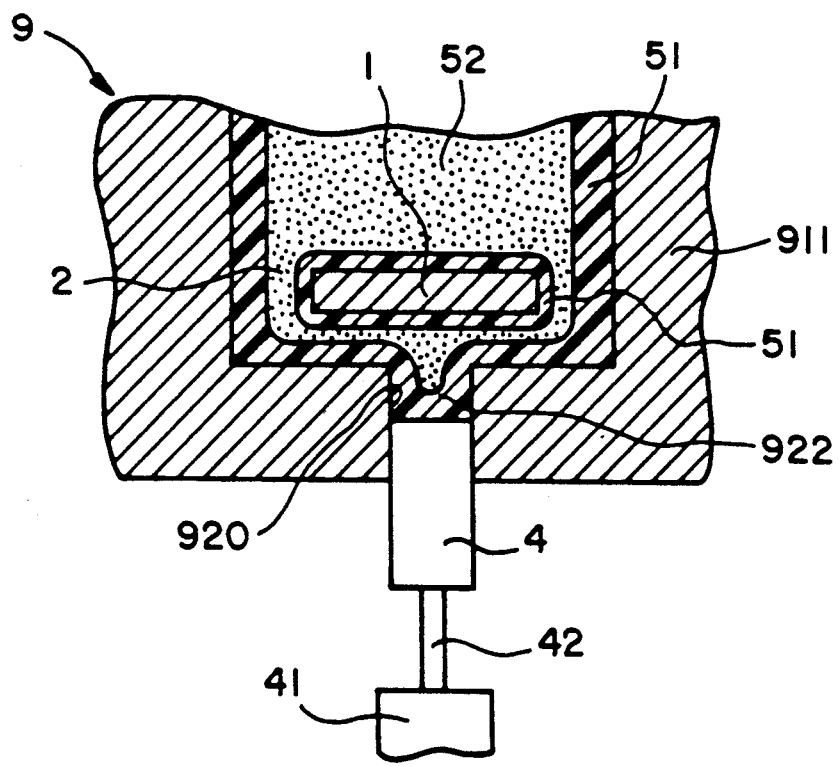
FIG. 6 is a fragmentary sectional view taking along line 6—6 of FIG. 5.

Referring to the process in further detail, a skin-forming material 51 is first injected into the cavity 91 by an injection molding machine, and a core-forming material 52 as an inner forming material is then injected into the skin-forming material 51, as shown in FIGS. 5 and 6, so that the cavity 91 is filled with the skin- and core-forming materials 51 and 52. The skin- and core-forming materials 51 and 52 are injected into the cavity 91 through the gap 2 between the dam 1 and the side walls of the cavity 91 and the gap 3 defined above the dam 1. Both skin- and core-forming materials 51 and 52, thus, are filled to have nearly uniform thicknesses as shown in FIGS. 5 and 6. This occurs in the same way as in the first embodiment.

Figure 4:
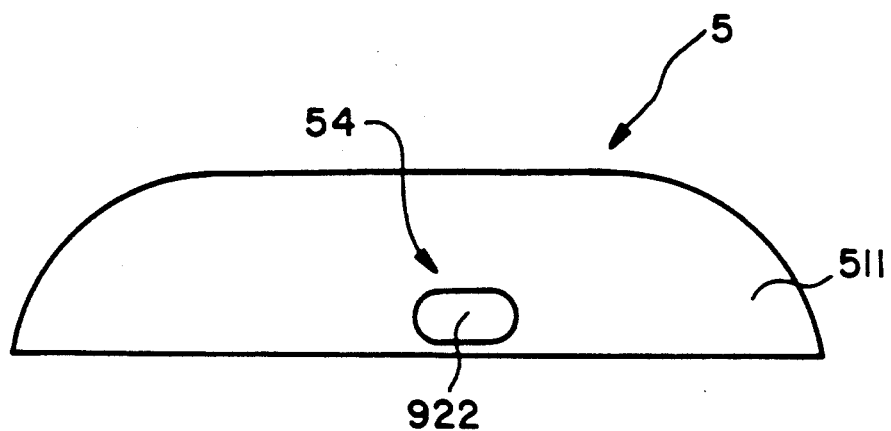
FIG. 4 is a front elevational view of a product as molded in the mold of FIG. 3.

The materials 51 and 52 as injected have a portion 922 which remains in the gate 920, as shown in FIG. 5. The slidable core member 4 stays in its retracted position during the injection of the materials 51 and 52, as shown in FIG. 5. As shown in FIGS. 7 and 8, after the skin- and core-forming materials 51 and 52 have been injected into the cavity 91 and the mold is held under pressure, the gate end portion 922 of the skin-forming material 51, which remains soft within the gate 920, is cut-off and forced into the cavity 91 by advancing the slidable core member 4. As a result, as shown in FIG. 4, a molded product of sandwich construction 5 is obtained with a cut surface 54 covered by the skin-forming material 51.

The gate end portion 922 of the skin-forming material 51 is forced through the hole 925 through which resin materials for forming the molded product are injected. Accordingly, the gate end portion 922 is severed and closes the hole 925 to form a cut surface 54 as a part of the skin. Because the skin-forming material 51 is an elastic and relatively soft resinous material, as soon as it has been forced into the hole 925, it expands and closes the hole 925 as if it were a rubber plug. Thus, the skin-forming material 51 which has been forced into the hole 925 makes intimate contact with the skin-forming material 51 around the hole 925 without allowing any clearance to be formed therebetween, as shown in FIG. 4.

As a result, the cut surface 54, which is of the same material 51 as the skin 511 around it, forms an integral part of the skin 511. Accordingly, the cut surface 54 presents as good and pleasing an appearance as the rest of the skin 511, and is comparable to it in durability, including weatherability and water resistance. Thus, the molded product 1 as a whole will be of good and pleasing appearance and exhibit a high level of durability.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. A method of molding a double layer molded product comprising:
    providing a mold including wall means defining a molding cavity; means defining a gate through which materials are injected into said molding cavity, said gate defining a longitudinal axis of injection; and means defining a dam within said molding cavity, said dam intersecting said axis of injection, at least one gap being defined between said dam and said wall means of said molding cavity;
    injecting a skin-forming material into said molding cavity through said gate; and
    injecting a core-forming material into said skin-forming material within said molding cavity through said gate, said core-forming material being intersected and diverted to flow through said at least one gap whereby pressure gradients along said axis of injection and in a direction transverse thereto are made substantially uniform whereby the core material is uniformly injected into the skin-forming material from said gate to more remote portions of said mold cavity.

2. A method as in claim 1, wherein said step of injecting a skin-forming material comprises injecting a synthetic resin.

3. A method as in claim 2, wherein said step of injecting a skin-forming material comprises injecting one of a resin obtained by blending polypropylene with an ethylene-propylene-diene rubber, an ethylene-vinyl acetate resin, an styrene-ethylene-butadiene-styrene resin, an styrene-butadiene-styrene resin, or a soft polyvinyl chloride resin.

4. A method as in claim 1, wherein said step of injecting a core-forming material comprises injecting a gas.

5. A method as in claim 1, wherein said step of injecting a core-forming material comprises injecting one of an acrylonitrile-styrene resin, an acrylonitrile-butadiene-styrene resin, a hard PVC resin, a polypropylene resin containing a filler, or a mixture of any of said resin and a reinforcing material.

6. A method as in claim 1, further comprising providing a slidable core member mounted so as to be slidable in said gate, and sliding said core member relative to said gate to force a part of said injected materials into said molding cavity and to sever the same.

7. A method as in claim 1, wherein said step of providing a mold includes providing a mold in which said dam is substantially perpendicular to said axis of injection.

8. A method as in claim 1, wherein said step of providing a mold includes providing a mold having at least two gaps defined between said dam and said wall means.

9. A method as in claim 8, wherein said step of providing comprises providing a mold having a pair of side walls, a top wall and a bottom wall, a gap being defined between said dam and each of said side walls.

10. A method as in claim 1, wherein said step of providing comprises providing a mold having a top wall, a bottom wall and at least one side wall and wherein a gap is defined between said dam and said side wall and another gap is defined between said dam and at least one of said top add bottom walls.

* * * * *